United States Patent Office 3,635,930
Patented Jan. 18, 1972

3,635,930
CARBON DISULFIDE WITH TRIALKYL PHOSPHINE AS ADJUVANT FOR POLYMERIZATION CATALYST AND POLYMERIZATION PROCESS
Lawrence M. Fodor, Bartlesville, Okla., assignor to Phillips Petroleum Company
No Drawing. Filed Mar. 27, 1969, Ser. No. 811,198
Int. Cl. C08f 1/56, 3/10
U.S. Cl. 260—93.7
6 Claims

ABSTRACT OF THE DISCLOSURE

Carbon disulfide alone or with an alkyl phosphine, e.g. tributyl phosphine complex, is used as adjuvant for titanium trichloride-aluminum chloride-organoaluminum or organoaluminum halide catalyst suitable for polymerization of 1-olefins, e.g., propylene. Polymers having higher than usual modulus and lower than usual xylenes-soluble content are producible with the improved catalyst at usual conditions. A synergistic effect has been discovered with respect to flexural modulus and xylene-soluble content of the polymer prepared.

---

This invention relates to a polymerization catalyst. It also relates to the polymerization of an olefin. Further, the invention relates to a complex adjuvant for a polymerization catalyst. The invention also relates to a novel catalyst suitable for polymerization of, e.g., olefins.

In one of its concepts the invention provides a carbon disulfide/tributyl phosphine complex as an adjuvant for the binary polymerization system

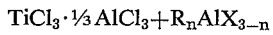
$$TiCl_3 \cdot \tfrac{1}{3} AlCl_3 + R_n AlX_{3-n}$$

where R is alkyl, aryl, cycloalkyl or combinations thereof having up to 20 carbon atoms, X is halogen, and $n$ is 1, 1.5, 2 or 3. In a further concept the invention provides a catalyst suitable for polymerization of an olefin, e.g., propylene and higher 1-olefins, the catalyst consisting of the binary polymerization system

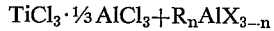
$$TiCl_3 \cdot \tfrac{1}{3} AlCl_3 + R_n AlX_{3-n}$$

where R is alkyl, aryl, cycloalkyl or combinations thereof having up to 20 carbon atoms, X is halogen and $n$ is 1, 1.5, 2, or 3, and a carbon disulfide/tributyl phosphine complex adjuvant therefor.

In an especially interesting concept of the invention it provides a process for the prolymerization of a 1-olefin, e.g., propylene, to produce by such polymerizations polymers having higher modulus and lower xylenes-soluble content. Polymers of alpha-olefins, particularly of propylene, having long been known and numerous procedures have been disclosed for their production. These polymers are characterized by a greater or lesser degree of stereospecificity, i.e., the presence of a certain amount of a crystalline component. Many of the useful properties of these polymers such as ultimate tensile, hardness, range of melting temperature, etc., appear to depend upon the stereo-specificity of the polymer. Flexural modulus, a property readily measurable by standard procedures, provides a reliable and consistent means for characterizing these polymers. The higher the stereospecificity of a polymer, the higher the flexural modulus values are found to be. For a commercially attractive product, flexural modulus values must be high, preferably above 200,000 p.s.i. and more preferably above 225,000 p.s.i. Heretofore it has frequently been necessary to extract amorphous fractions of the polymer in order to provide products having flexural moduli in this range. It is therefore highly desirable to minimize the production of amorphous polymer, as measured, for example, by the amount of polymer soluble in mixed xylenes.

The binary catalyst system described above is well known for the polymerization of 1-olefins such as propylene. The titanium trichloride complex in this catalyst system is usually prepared by the reaction of titanium tetrachloride with aluminum, and is well known in the industry. The $R_nAlX_{3-n}$ compounds that can be used are described and illustrated in copending application Ser. No. 527,056. Gerald Kahle et al., filed Feb. 14, 1966, now Pat. No. 3,479,330, the disclosure of which is incorporated herein by reference; a preferred compound is diethylaluminum chloride. It is known to promote this binary catalyst system with adjuvants.

I have now found that carbondisulfide/tributyl phosphine complex is an adjuvant for such a catalyst.

The use of tributyl phosphine as an adjuvant is known, but it has now been found that a synergistic improvement in polymer yield and properties is obtained by using a carbon disulfide/tributyl phosphine complex as adjuvant.

It is an object of this invention to provide an improved catalyst for polymerization of, say, an olefin. It is another object of this invention to provide an adjuvant for a catalyst suitable for polymerization of, say, an olefin. It is a further object of this invention to provide an adjuvant for a polymerization catalyst useful in the polymerization of a 1-olefin, e.g., propylene. It is a further object of this invention to provide a process for the polymerization of a 1-olefin having up to 8 carbon atoms per molecule to obtain a polymer having higher than usual modulus and lower than usual xylene-soluble content. It is a further object of this invention to provide at least one adjuvant for the binary polymerization system herein disclosed. Still further, it is an object of this invention to provide a synergistic adjuvant for such a polymerization system.

Other aspects, concepts, and objects of the invention are apparent from a study of this disclosure and the appended claims.

According to the present invention a carbon disulfide/alkyl phosphine complex is employed as an adjuvant for the binary polymerization system

$$TiCl_3 \cdot \tfrac{1}{3} AlCl_3 + R_n AlX_{3-n}$$

where R is alkyl, aryl, cycloalkyl or combinations thereof having up to 20 carbon atoms, X is halogen, and $n$ is 1, 1.5, 2, or 3. Further according to the present invention there is provided a process for the polymerization of a 1-olefin, e.g., propylene, employing a catalyst as set out herein.

The compounds represented by the formula $R_nAlX_{3-n}$ and utilized as component (A) of the catalyst system are well known in the art. Examples are triethylaluminum, diethylaluminum chloride, ethylaluminum dichloride, ethylaluminum sesquichloride, and the like.

In place of the tributyl phosphine, other alkyl phosphines can be used in which the alkyl groups have 1 to 12 carbon atoms.

Broad and preferred ranges for the molar ratio of the catalyst components are:

| Ratio to $TiCl_3 \cdot \tfrac{1}{3} AlCl_3$ | Broad | Preferred |
|---|---|---|
| $R_nAlX_{3-n}$ | 0.5:1–10:1 | 1:1–7.5: |
| Adjuvant | 0.01:1–1:1 | 0.05:1–0.5: |

The total catalyst concentration is usually within the range of from about 0.005 to about 10 weight percent of the olefin being polymerized, but concentrations outside this range are operative.

The polymerization reaction can be carried out either in a mass system—i.e., the olefin being polymerized acts as reaction medium—or in an inert hydrocarbon diluent, such as a paraffin, cycloparaffin, or aromatic hydrocarbon having up to 20 carbon atoms per molecule. Examples of hydrocarbons that can be used are pentane, hexane, heptane, isooctane, eicosane, cyclohexane, methylcyclopentane, benzene, toluene, naphthalene, anthracene, and the like. Where an inert diluent is used, the volume ratio of diluent to propylene is in the range of 1:1 to 10:1, preferably 3:1 to 7:1.

The polymerization can be conducted at temperatures in the range of from about 80 to about 250° F., preferably 100 to 200° F. The pressure can be sufficient to maintain the reaction mixture substantially in liquid phase or—particularly in a mass system—can be such that the olefin is in the gas phase. The reaction time is in the range 10 minutes to 75 hours, more frequently, 30 minutes to 25 hours.

Although the invention is illustrated by the polymerization of propylene, any aliphatic 1-olefin having up to 8 carbon atoms per molecule can be used. Preferably, those having 3 to 7 carbon atoms are used, such as propylene, 1-butene, 1-hexene, 4-methyl-1-pentene, 1-heptene, and the like, and mixtures thereof.

It is within the scope of the invention to use hydrogen in a concentration of about 0.08 to 1 mol percent of the propylene for controlling the molecular weight of the polymer.

EXAMPLE

The process of the invention was demonstrated by polymerizing propylene in a one-liter, stirred reactor in 2.5-hour runs at 130° F. and about 300 p.s.i.g. with 250 grams of propylene and 1 liter of hydrogen (equivalent to 0.67 mol percent hydrogen on the propylene) present in the reaction system. The data obtained are given in the tabulation.

The order of addition of the various catalyst components is not critical, but the one used in the example and frequently used in the industry is: (1) Titanium trichloride complex; (2) aluminum alkyl; (3) adjuvant. After addition of the catalyst to the reactor, the hydrogen and monomer were added in that order in the example, and are usually added in that order.

I prefer to handle the adjuvant as a 0.05 to 2 molar solution in an inert hyrocarbon such as previously described. In the example a 0.1 molar solution in pentane was used. In the case of the carbon disulfide/trialkyl phosphine complex, I prefer to prepare it by mixing approximately equimolar quantities of the two reactants in an inert hydrocarbon. Formation of the complex is indicated by the appearance of a deep coloration in the solution. Mol ratios outside this range, such as 0.5/1 to 1/0.5, can be used. When mol ratios other than 1/1 are used, the result is simply the presence of carbon disulfide or trialkyl phosphine in excess of that in the complex.

results in a decrease in catalyst productivity, there is an increase in flexural modulus of the polymer and a decrease in xylenes-soluble content. Comparison of the data for Runs 7 and 8 with those for Runs 2 and 3 (tributyl phosphine) and Runs 5 and 6 (carbon disulfide) as well as with the control (Run 1) indicates that use of the carbon disulfide/tributyl phopshine complex results in a synergistic improvement in flexural modulus and xylenes-soluble content, and that—depending on the concentration level of the complex—high productivity can be maintained at a high modulus and low xylenes-soluble content, or an even higher modulus and lower xylenes-soluble content can be obtained at somewhat lower productivity.

Reasonable variation and modification are possible within the scope of the foregoing disclosure and the appended claims to the invention the essence of which is that an alkyl phosphine complexed with carbon disulfide has been discovered to be a synergistic adjuvant, for the binary polymerization system $TiCl_3 \cdot \tfrac{1}{3} AlCl_3 + R_n AlX_{3-n}$, and that with such an adjuvant said polymerization system yields polymers, e.g., 1-olefin polymers, e.g., polypropylene, having a higher than usual modulus and a lower than usual xylenes-soluble content.

I claim:

1. A catalyst system formed on admixing a titanium trichloride-aluminum trichloride complex, a compound of the formula $R_n AlX_{3-n}$ wherein R is alkyl aryl, cycloalkyl, or combination thereof having up to 20 carbon atoms, X is halogen, and n is 1, 1.5, 2, or 3 and a carbon disulfide/alkyl phosphine complex, the alkyl of the alkyl phosphine having up to 12 carbon atoms wherein the mol ratio of the $CS_2$ and the alkyl phosphine to give the complex is in the approximate range of 0.5:1 to 1:0.5, and the ratios of the $R_n AlX_{3-n}$ compound and $CS_2$/alkyl phosphine complex, to the titanium trichloride-aluminum trichloride complex, respectively, are 0.5:1 to 10:1 and 0.01:1 to 1:1.

2. A catalyst according to claim 1 wherein the titanium trichloride-aluminum trichloride complex is $TiCl_3 \cdot \tfrac{1}{3} AlCl_3$ and the mol ratios of the $R_n AlX_{3-n}$:carbon disulfide/alkyl phosphine complex: $TiCl_3 \cdot \tfrac{1}{3} AlCl_3$ are about 2:0.1–0.2:1 and the $R_n AlX_{3-n}$ is diethylaluminum chloride.

3. A process for the polymerization of a 1-olefin having up to 8 carbon atoms per molecule which comprises polymerizing said olefin under polymerizing conditions in the presence of a catalyst system according to claim 1.

4. A process according to claim 3 wherein the 1-olefin is propylene, the $R_n AlX_{3-n}$ compound is a compound selected from triethylaluminum, diethylaluminum chloride, ethylaluminum dichloride, ethylaluminum sesquichloride, wherein the mol ratio of the $CS_2$ and the alkyl phosphine to give the complex is in the approximate range of 0.5:1 to 1:0.5, the ratios of the $R_n AlX_{3-n}$ compound and $CS_2$/alkyl phosphine complex, to the titanium trichloride-aluminum trichloride complex, respectively, are 0.5:1 to 10:1 and 0.0:1 to 1:1 and the total catalyst concentra-

| Run No. | Mol ratio [a] | | | Catalyst wt. percent [b] | Productivity, g./g. of Ti complex | Flexural modulus, p.s.i.×10⁻³ [c] | Xylenes solubles wt. percent [d] | Melt flow [e] | Adjuvant |
|---|---|---|---|---|---|---|---|---|---|
| | $R_nAlX_{3-n}$ | Adjuvant | $TiCl_3.\tfrac{1}{3}AlCl_3$ | | | | | | |
| 1 | 2 | 0 | 1 | 0.176 | 663 | 183 | 5.4 | 0.29 | None. |
| 2 | 2 | 0.1 | 1 | 0.186 | 665 | 201 | 3.8 | 0.39 | Bu₃P. |
| 3 | 2 | 0.2 | 1 | 0.195 | 655 | 182 | 5.2 | 1.09 | Bu₃P. |
| 4 | 2 | 0.05 | 1 | 0.178 | 564 | 203 | 3.9 | 0.34 | CS₂. |
| 5 | 2 | 0.1 | 1 | 0.180 | 586 | 213 | 4.1 | 0.28 | SS₂. |
| 6 | 2 | 0.2 | 1 | 0.184 | 600 | 219 | 3.6 | 0.58 | CS₂. |
| 7 | 2 | 0.1 | 1 | 0.190 | 664 | 224 | 2.9 | 0.30 | CS₂.Bu₃P. |
| 8 | 2 | 0.2 | 1 | 0.202 | 435 | 251 | 2.5 | 1.94 | CS₂.Bu₃P. |

[a] $R_nAlX_{3-n}$ was diethylaluminum chloride in all runs.
[b] Based on propylene.
[c] ASTM D 790–61.
[d] Determined by placing 0.95 g. of polymer in a centrifuge tube, adding 95 ml. mixed xylenes, heating for 15 minutes at 285° F., cooling, centrifuging, evaporating the solvent from a 25-ml. aliquot of the supernatant liquid, weighing the residue, and multiplying by 400.
[e] ASTM D 1238–62T, Condition L.

Comparison of the data for Runs 4–6 with that for Run 1 indicates that although use of carbon disulfied adjuvant tion is within the approximate range of from about 0.005 to about 10 weight percent of the olefin being polymerized.

5. A process according to claim 4 wherein the mol ratios of the $R_nAlX_{3-n}$:carbon disulfide/alkyl phosphine complex:$TiCl_3 \cdot \frac{1}{3}AlCl_3$ are about 2:0.1–0.2:1 and the $R_nAlX_{3-n}$ is diethylaluminum chloride.

6. A process according to claim 3 wherein the 1-olefin is propylene and the complex is $CS_2 \cdot Bu_3P$.

References Cited

UNITED STATES PATENTS 2,832,759 4/1958 Nowlin et al. _____ 260—94.9
3,317,502 5/1967 Harban et al. _____ 260—93.7

FOREIGN PATENTS 1,231,090 9/1960 France.
3,826,786 1963 Japan.

JOSEPH L. SCHOTER, Primary Examiner
E. J. SMITH, Assistant Examiner

U.S. Cl. X.R.

252—429 B; 260—94.9 C, 94.9 E

UNITED STATES PATENT OFFICE

CERTIFICATE OF CORRECTION

Patent No. 3,635,930            Dated: January 18, 1972

It is certified that error appears in the above-identified patent and that said Letters Patent are hereby corrected as shown below:

Column 5, line 1, after the word "wherein", kindly insert

— the titanium trichloride-aluminum trichloride complex is $TiCl_3 \cdot 1/3\ AlCl_3$ Signed and sealed this 15th day of August 1972.

(SEAL)
Attest:

EDWARD M. FLETCHER, JR.      ROBERT GOTTSCHALK
Attesting Officer               Commissioner of Patents